(12) United States Patent
Pawar et al.

(10) Patent No.: US 11,924,858 B2
(45) Date of Patent: *Mar. 5, 2024

(54) PERFORMING INTER-BAND CARRIER AGGREGATION BASED ON DEVICE CAPABILITY

(71) Applicant: Sprint Spectrum LP, Overland Park, KS (US)

(72) Inventors: Hemanth Pawar, Brambleton, VA (US); Krishna Sitaram, Chantilly, VA (US); Shilpa Kowdley Srinivas, Brambleton, VA (US)

(73) Assignee: Sprint Spectrum LP, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,961

(22) Filed: Jan. 23, 2023

(65) Prior Publication Data

US 2023/0156757 A1 May 18, 2023

Related U.S. Application Data

(63) Continuation of application No. 16/828,182, filed on Mar. 24, 2020, now Pat. No. 11,589,354.

(51) Int. Cl.
*H04W 72/51* (2023.01)
*H04W 72/0453* (2023.01)

(52) U.S. Cl.
CPC ....... *H04W 72/51* (2023.01); *H04W 72/0453* (2013.01)

(58) Field of Classification Search
None
See application file for complete search history.

(56) References Cited

U.S. PATENT DOCUMENTS

| 9,860,051 | B2 | 1/2018 | Gross et al. |
| 9,900,142 | B2 | 2/2018 | Yi et al. |
| 10,856,175 | B1 | 12/2020 | Broyles et al. |
| 2014/0328220 | A1* | 11/2014 | Khlat .............. H04B 1/0064 370/278 |
| 2015/0031410 | A1 | 1/2015 | Lim et al. |
| 2019/0260556 | A1* | 8/2019 | Lim .............. H04B 15/04 |
| 2019/0349863 | A1* | 11/2019 | Lim .............. H04W 52/42 |

* cited by examiner

*Primary Examiner* — Hong S Cho
(74) *Attorney, Agent, or Firm* — Jones Robb, PLLC

(57) ABSTRACT

Performing inter-band carrier aggregation based on device capability includes monitoring a dominant type of wireless devices in a wireless sector based on whether or not they are capable of inter-band carrier aggregation, and enabling or disabling inter-band carrier aggregation in the sector based on the dominant type. Enabling/disabling inter-band carrier aggregation can include allowing or preventing usage of usage of a low-frequency carrier as a primary component carrier aggregated with a high-frequency carrier as a secondary component carrier. Carriers using FDD and TDD duplexing modes are included.

20 Claims, 6 Drawing Sheets

PERFORMING INTER-BAND CARRIER AGGREGATION BASED ON DEVICE CAPABILITY

This patent application is a continuation of U.S. patent application Ser. No. 16/828,182, filed on Mar. 24, 2020, now issued as U.S. Pat. No. 11,589,354 on Feb. 21, 2023, which is incorporated by reference in its entirety for all purposes.

TECHNICAL BACKGROUND

A wireless network may include one or more access nodes, such as base stations, for providing wireless voice and data service to wireless devices in various coverage areas of the one or more access nodes. As wireless networks evolve and grow, there are ongoing challenges in communicating data across different types of networks. For example, with increasing numbers and types of access nodes deployed within wireless networks, network operators are using carrier aggregation that enables wireless devices and access nodes to communicate using a combination of component carriers. Component carriers utilize air-interface resources (such as time-frequency resource blocks) spanning different sets of frequencies within one or more frequency bands available to use within a wireless sector. For example, intra-band carrier aggregation involves two or more component carriers using the same or contiguous frequency bands, and inter-band carrier aggregation involves component carriers using different frequency bands that may be separated by a gap. Wireless devices that are capable of inter-band carrier aggregation can receive and send data streams using component carriers in different frequency bands. Further, access nodes can be configured to deploy a frequency-division-duplexing (FDD) carrier and a time-division-duplexing (TDD) carrier, and schedule data transmissions via both carriers using either intra-band or inter-band carrier aggregation. Thus, wireless devices that are capable of carrier aggregation and TDD and FDD communication can send and receive data streams using any combination of different TDD and FDD carriers.

However, in some instances, the ability of wireless devices to use inter-band carrier aggregation can negatively affect network performance for other wireless devices incapable of using inter-band carrier aggregation. For example, an access node may be configured to deploy two carriers utilizing different frequency bands. Owing to the nature of radio signals, the carrier utilizing a higher frequency may serve wireless devices over a smaller coverage area than the carrier utilizing the lower frequency. While wireless devices closer to the access node can avail of the greater throughput provided by the high-frequency carrier, wireless devices further away from the access node and outside the coverage area of the high-frequency carrier have no choice but to use the low-frequency carrier. Further, the downlink coverage area of the high-frequency carrier may be larger than the uplink coverage area, which can result in dropped connections for wireless devices attached to and located near a cell edge of the high-frequency carrier. Some wireless devices can be configured to use inter-band carrier aggregation with the low-frequency carrier as the primary component carrier (enabling uplink and control transmissions) and aggregate the high-frequency carrier as the secondary component carrier. However, increasing numbers of wireless devices using the low-frequency carrier as a primary component carrier can cause overloading on the low-frequency carrier, particularly in the uplink and/or control channels. This can negatively impact quality of service for other wireless devices attached to the low-frequency carrier and not capable of inter-band carrier aggregation.

Overview

Exemplary embodiments described herein include methods, systems, and processing nodes for activating or deactivating inter-band carrier aggregation in a wireless sector based on a dominant capability of wireless devices within the sector. An exemplary method for performing inter-band carrier aggregation based on device capability includes monitoring a dominant type of wireless devices in a wireless sector, wherein the dominant type is based on whether or not the wireless devices are capable or incapable of inter-band carrier aggregation, when the dominant type comprises wireless devices capable of inter-band carrier aggregation, enabling usage of a low-frequency carrier as a primary component carrier for a carrier aggregation mode of operation, and when the dominant type comprises wireless devices incapable of inter-band carrier aggregation, disabling usage of the low-frequency carrier as a primary component carrier for the carrier aggregation mode of operation.

An exemplary system for performing inter-band carrier aggregation based on device capability includes an access node configured to deploy at least a first carrier utilizing a first frequency band and a second carrier utilizing a second frequency band, the second frequency band comprising higher frequencies than the first frequency band, and a processor coupled to the access node. The processor can be configured to perform operations including identifying a dominant type of wireless device within a wireless sector, wherein the dominant type of wireless device is based on a capability of a wireless device to perform inter-band carrier aggregation, and enabling or disabling inter-band carrier aggregation in the wireless sector based on the dominant type of wireless device.

An exemplary processing node for performing inter-band carrier aggregation based on device capability is configured to perform operations including monitoring a dominant type of wireless devices in a wireless sector, wherein the dominant type is based on whether or not the wireless devices are capable or incapable of inter-band carrier aggregation, when the dominant type comprises wireless devices capable of inter-band carrier aggregation, enabling usage of a low-frequency carrier as a primary component carrier for a carrier aggregation mode of operation, and when the dominant type comprises wireless devices incapable of inter-band carrier aggregation, disabling usage of the low-frequency carrier as a primary component carrier for the carrier aggregation mode of operation.

DETAILED DESCRIPTION

The embodiments illustrated herein describe methods and systems whereby activation of inter-band carrier aggregation within a sector is based on a dominant type of wireless device within the sector. The dominant type of wireless device is determined based on an inter-band carrier aggregation capability of wireless devices within the sector. Determining the dominant type of wireless device can be based on how many wireless devices are capable of inter-band carrier aggregation versus how many do not. Alternatively or in addition, determining the dominant type of wireless device can be based on a throughput requirement of wireless devices capable of inter-band carrier aggregation versus a throughput requirement of wireless devices that are not capable of inter-band carrier aggregation. If the quantity (or throughput requirement or any other measure as further described below) of wireless devices capable of inter-band carrier aggregation exceeds that of wireless devices not having this capability, then inter-band carrier aggregation is enabled in the sector. Enabling inter-band carrier aggregation in this case can include allowing capable wireless devices to use two carriers deployed in two different frequency bands in a carrier aggregation mode of operation. Whereas, if the quantity (or throughput requirement or any other measure) of wireless devices capable of inter-band carrier aggregation is lower than that of wireless devices not having this capability, then inter-band carrier aggregation is disabled in the sector. Disabling inter-band carrier aggregation in this case can include preventing capable wireless devices to use the two carriers deployed in two different frequency bands.

When inter-band carrier aggregation is enabled, the majority of wireless devices (based on quantity, throughput, etc.) that are capable of carrier aggregation can use both carriers, in particular using one carrier as a primary component carrier for upload transmissions and/or control signaling while one or more additional carriers can be used for downlink transmissions. Meanwhile, when inter-band carrier aggregation is disabled, the majority of wireless devices (based on quantity, throughput, etc.) that are not capable of carrier aggregation can continue to use either carrier in different frequency bands, or can aggregate multiple carriers sharing the same (or a contiguous) frequency band via intra-band carrier aggregation. Further, when inter-band carrier aggregation is disabled, additional resources are available in the control channel and for uplink transmissions for this majority of wireless devices incapable of using inter-band carrier aggregation. These and additional operations are further described with respect to the embodiments depicted in FIGS. 1-6 below.

Figure 1:
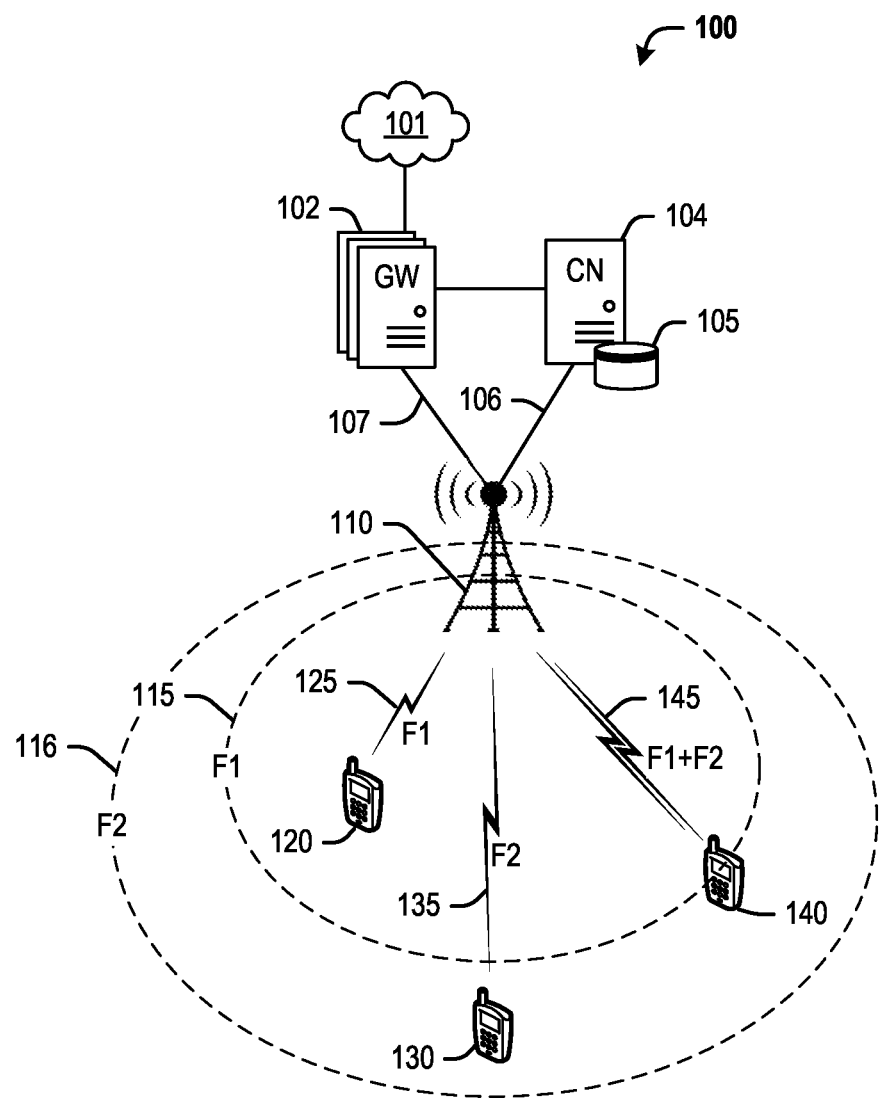
FIG. 1 depicts an exemplary system for performing inter-band carrier aggregation based on device capability.

FIG. 1 depicts an exemplary system 100 for selecting between MIMO and carrier aggregation modes of operation in a wireless network. System 100 comprises a communication network 101, gateway node(s) 102, controller node 104, access node 110, and wireless devices 120, 130, and 140. Access node 110 can be any network node configured to provide communication between end-user wireless devices 120, 130, 140 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. Moreover, it is noted that while access node 110 and wireless devices 120, 130, 140 are illustrated in FIG. 1, any number of access nodes and wireless devices can be implemented within system 100.

By virtue of comprising a plurality of antennae as further described herein, access node 110 can deploy a wireless air interface using two or more frequency bands, including but not limited to a first frequency band F1 over a coverage area 115, and a second frequency band F2 over a coverage area 116. In an exemplary embodiment, frequency band F1 uses frequencies that are higher than frequency band F2. Thus, due to propagation characteristics, coverage area 115 is smaller than coverage area 116. Further, the different sets of antennae can be used to implement various transmission modes or operating modes in each sector, including but not limited to MIMO (including SU-MIMO, MU-MIMO, mMIMO, beamforming, etc.), carrier aggregation (including inter-band and intra-band carrier aggregation), and different duplexing modes (including frequency-division-duplexing or FDD and time-division-duplexing or TDD). For example, as illustrated herein, a portion of antennae of access node 110 can be allocated towards deploying a first carrier using frequency F1, to which wireless device 120 attaches using wireless connection 125. Another portion of antennae of access node 110 can be allocated towards deploying a second carrier using frequency F2, to which wireless device 130 attaches using wireless connection 135. Further, wireless device 140, at an edge of coverage area 115, can be configured to send and receive data via wireless connection 145, which includes resources from both carriers F1 and F2. Further, the first carrier using frequency F1 can be configured to utilize either FDD or TDD modes of operation, and the second carrier using frequency F2 can be configured to utilize a different mode of operation than the first carrier. Thus, in an exemplary embodiment, wireless device 140 is capable of inter-band carrier aggregation using the second carrier F2 as a primary component carrier for control and uplink transmissions, and the first carrier F1 as a secondary component carrier for downlink transmissions. Other combinations of inter-band carrier aggregation and duplexing modes can be envisioned by those having ordinary skill in the art in light of this disclosure, and dependent on the specific network in which the disclosed embodiments are implemented. For example, wireless device 120 may not be capable of inter-band carrier aggregation, yet may be able to perform intra-band carrier aggregation, utilizing two carriers deployed in frequency F1 or an immediately contiguous frequency band.

Further, access node 110 (or any other entity within system 100, such as processing nodes described herein) may be configured to execute a method including monitoring a dominant type of wireless devices in a wireless sector deployed by access node 110, wherein the dominant type is based on whether or not the wireless devices are capable or incapable of inter-band carrier aggregation, when the dominant type comprises wireless devices capable of inter-band carrier aggregation, enabling usage of a low-frequency carrier (e.g. carrier F2) as a primary component carrier for a carrier aggregation mode of operation and, when the dominant type comprises wireless devices incapable of inter-band carrier aggregation, disabling usage of the low-frequency carrier as a primary component carrier for the carrier aggregation mode of operation. When the dominant type comprises wireless devices capable of inter-band carrier aggregation, usage of the high-frequency carrier (e.g. carrier F1) as a secondary component carrier is enabled. Further, when the dominant type comprises wireless devices incapable of inter-band carrier aggregation, inter-band carrier aggregation is disabled. Meanwhile, usage of the high-frequency carrier as the primary component carrier may be enabled. For example, intra-band carrier aggregation can be performed with the high-frequency carrier or contiguous carriers thereof.

Further, the dominant type of wireless device is identified based on an identifier of the wireless device. For example, an international mobile subscriber identity (IMSI), model number, etc. may be apparent to access node 110, controller node 104, etc. during, for example, an attach procedure during which each wireless device 120, 130, 140 transmits device capabilities. Based on the identifier, a capability of the wireless device to perform inter-band carrier aggregation can be determined. Thus, in an exemplary embodiment, identifying the dominant type of wireless device further comprises determining that a majority of total wireless devices in the sector are capable or incapable of performing inter-band carrier aggregation. In another exemplary embodiment, identifying the dominant type of wireless device further comprises determining that a majority of throughput usage in the sector is associated with wireless devices that are either capable or incapable of performing inter-band carrier aggregation. The throughput requirement may comprise an actual throughput requirement (as in, a measured throughput requirement based on an application, bearer, packet inspection, etc.) or a predicted or future throughput requirement (as in a request for a connection or communication channel from an application, and so on).

Further, enabling or disabling usage of the low-frequency carrier as the primary component carrier for the carrier aggregation mode of operation comprises broadcasting an indicator on either frequency band F1 or F2, the indicator for indicating whether inter-band carrier aggregation is enabled or disabled within the sector. For example, access node 110, upon determining that inter-band carrier aggregation capable wireless devices dominate one or more sectors, may broadcast an indicator indicating that inter-band carrier aggregation is enabled. Responsive to the indicator, wireless devices capable of inter-band carrier aggregation (such as wireless device 140) can attach to frequency F2 as a primary component carrier and F1 as a secondary component carrier. Thus, in an exemplary embodiment, the indicator can identify which carrier to use as a primary component carrier.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130, 140 may be any device, system, combination of devices, or other such communication platform capable of communicating wirelessly with access node 110 using one or more frequency bands deployed therefrom. Wireless devices 120, 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130, 140, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information pertinent to the embodiments described herein, such as associations of types of wireless devices 120, 130, 140, etc. with capabilities to perform inter-band carrier aggregation, throughput requirements, control channel usage of carriers F1, F2, etc. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
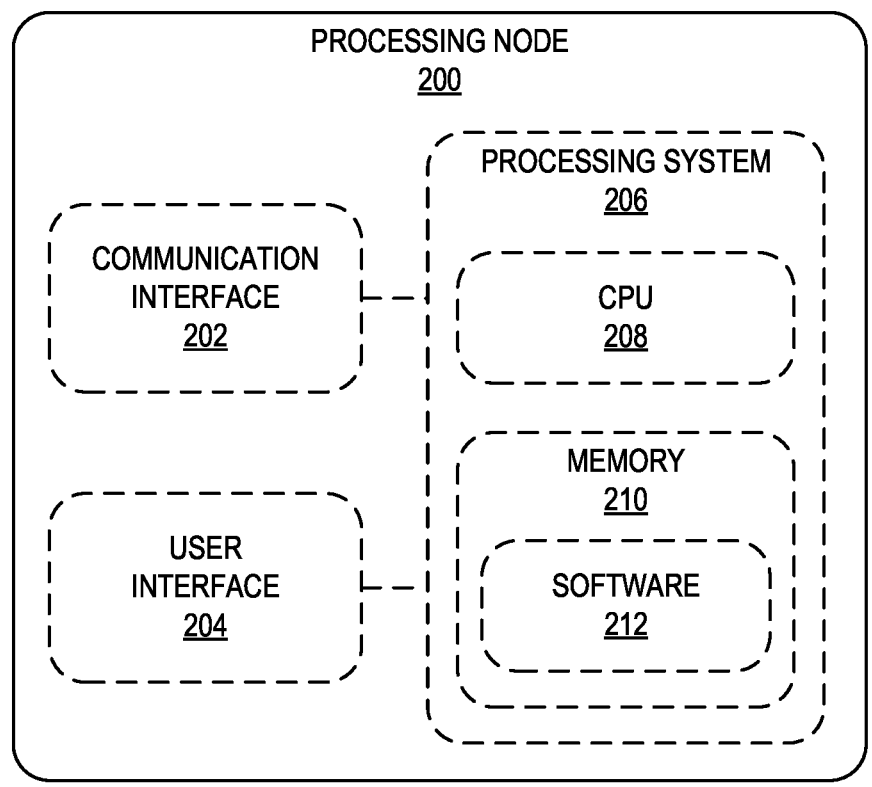
FIG. 2 depicts an exemplary processing node for performing inter-band carrier aggregation based on device capability.

FIG. 2 depicts an exemplary processing node, comprising a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include logic for performing the operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 includes logic for monitoring a dominant type of wireless devices in a wireless sector, wherein the dominant type is based on whether or not the wireless devices are capable or incapable of inter-band carrier aggregation, when the dominant type comprises wireless devices capable of inter-band carrier aggregation, enabling usage of a low-frequency carrier as a primary component carrier for a carrier aggregation mode of operation, and when the dominant type comprises wireless devices incapable of inter-band carrier aggregation, disabling usage of the low-frequency carrier as a primary component carrier for the carrier aggregation mode of operation. In another exemplary embodiment, software 212 includes logic for identifying a dominant type of wireless device within a wireless sector, wherein the dominant type of wireless device is based on a capability of a wireless device to perform inter-band carrier aggregation, and enabling or disabling inter-band carrier aggregation in the wireless sector based on the dominant type of wireless device. In yet another exemplary embodiment, software 212 includes logic for determining that a dominant type of wireless device within a sector comprises wireless devices capable of inter-band carrier aggregation, enabling usage of a low-frequency carrier as a primary component carrier for a carrier aggregation mode of operation, determining that the dominant type comprises wireless devices incapable of inter-band carrier aggregation, and disabling usage of the low-frequency carrier as a primary component carrier for the carrier aggregation mode of operation.

Figure 3:
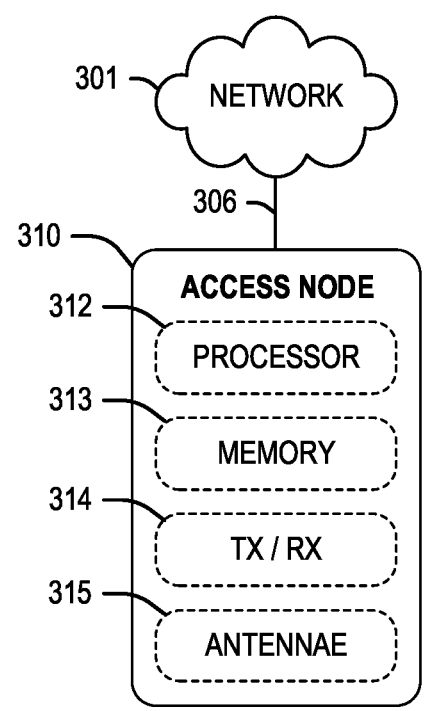
FIG. 3 depicts an exemplary access node for performing inter-band carrier aggregation based on device capability.

FIG. 3 depicts an exemplary access node 310. Access node 310 is configured as an access point for providing network services from network 301 to end-user wireless devices such as wireless devices 120, 130 in FIG. 1. Access node 310 is illustrated as comprising a memory 313 for storing logical modules that perform operations described herein, a processor 312 for executing the logical modules, and a transceiver 314 for transmitting and receiving signals via antennae 315. Combination of antennae 315 and transceiver 314 are configured to deploy a wireless air interface using at least two carriers, each of which uses a different frequency band. Further, the different sets of antennae can be used to implement various transmission modes or operating modes in each sector, including but not limited to MIMO (including SU-MIMO, MU-MIMO, mMIMO, beamforming, etc.), carrier aggregation (including inter-band and intra-band carrier aggregation), and different duplexing modes (including frequency-division-duplexing or FDD and time-division-duplexing or TDD). Further, access node 310 is communicatively coupled to network 301 via communication interface 306, which may be any wired or wireless link as described above.

In an exemplary embodiment, memory 313 includes logic for monitoring a dominant type of wireless devices in a wireless sector, wherein the dominant type is based on whether or not the wireless devices are capable or incapable of inter-band carrier aggregation, when the dominant type comprises wireless devices capable of inter-band carrier aggregation, enabling usage of a low-frequency carrier as a primary component carrier for a carrier aggregation mode of operation, and when the dominant type comprises wireless devices incapable of inter-band carrier aggregation, disabling usage of the low-frequency carrier as a primary component carrier for the carrier aggregation mode of operation. In another exemplary embodiment, memory 313 includes logic for identifying a dominant type of wireless device within a wireless sector, wherein the dominant type of wireless device is based on a capability of a wireless device to perform inter-band carrier aggregation, and enabling or disabling inter-band carrier aggregation in the wireless sector based on the dominant type of wireless device. In yet another exemplary embodiment, memory 313 includes logic for determining that a dominant type of wireless device within a sector comprises wireless devices capable of inter-band carrier aggregation, enabling usage of a low-frequency carrier as a primary component carrier for a carrier aggregation mode of operation, determining that the dominant type comprises wireless devices incapable of inter-band carrier aggregation, and disabling usage of the low-frequency carrier as a primary component carrier for the carrier aggregation mode of operation.

Figure 4:
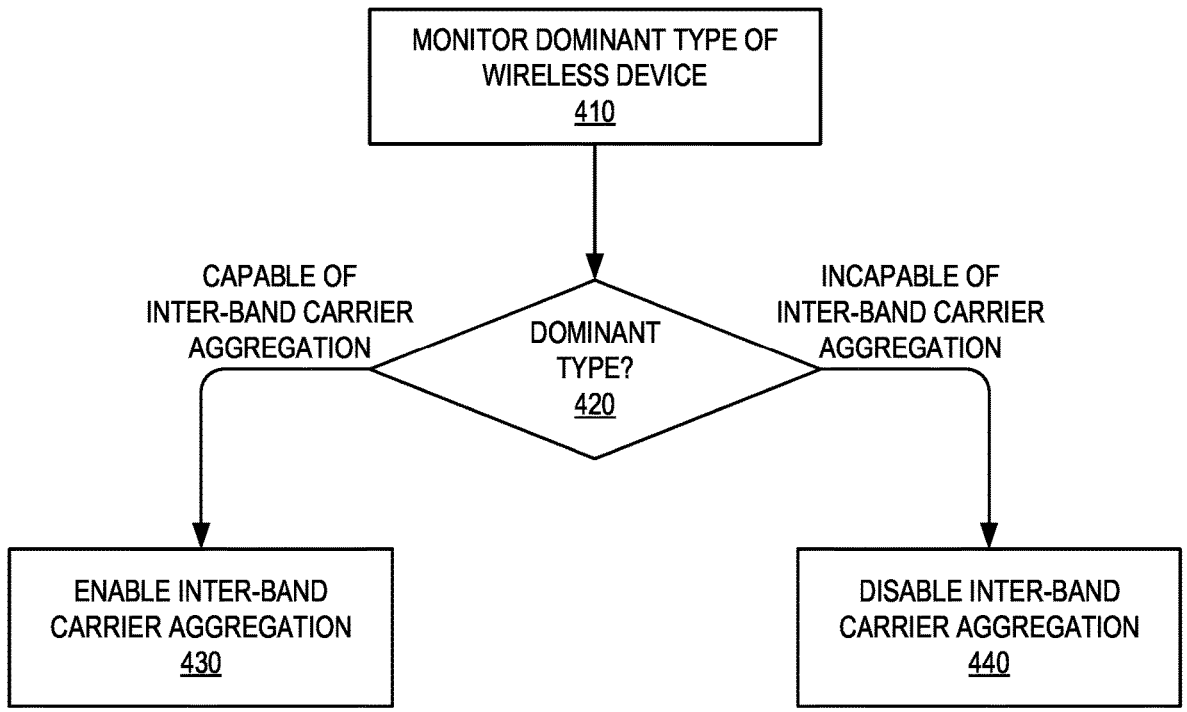
FIG. 4 depicts an exemplary method for performing inter-band carrier aggregation based on device capability.

FIG. 4 depicts an exemplary method for performing inter-band carrier aggregation based on device capability. The method of FIG. 4 is illustrated with respect to an access node, such as access node 110, 310, or a processing node, such as processing node 200. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a dominant type of a wireless device is monitored. The dominant type of wireless device is determined based on an inter-band carrier aggregation capability of wireless devices within the sector. Monitoring the dominant type of wireless device can be based on determining, on an ongoing basis, how many wireless devices are capable of inter-band carrier aggregation versus how many do not within a sector. Alternatively or in addition, monitoring the predominant type of wireless device can be based on determining a throughput requirement of wireless devices capable of inter-band carrier aggregation versus a throughput requirement of wireless devices that are not capable of inter-band carrier aggregation. Further, the dominant type of wireless device is identified based on an identifier of the wireless device. For example, an international mobile subscriber identity (IMSI), model number, etc. may be apparent to a serving access node, controller node, etc. during, for example, an attach procedure during which each wireless device transmits device capabilities. Based on the identifier, a capability of the wireless device to perform inter-band carrier aggregation can be determined. Thus, in an exemplary embodiment, identifying the dominant type of wireless device further comprises determining that a majority of total wireless devices in the sector are capable or incapable of performing inter-band carrier aggregation. In another exemplary embodiment, identifying the dominant type of wireless device further comprises determining that a majority of throughput usage in the sector is associated with wireless devices that are either capable or incapable of performing inter-band carrier aggregation. The throughput requirement may comprise an actual throughput requirement (as in, a measured throughput requirement based on an application, bearer, packet inspection, etc.) or a predicted or future throughput requirement (as in a request for a connection or communication channel from an application, and so on).

At 420, if the quantity (or throughput requirement or any other measure as further described below) of wireless devices capable of inter-band carrier aggregation exceeds that of wireless devices not having this capability, then at 430 inter-band carrier aggregation is enabled in the sector. Enabling inter-band carrier aggregation in this case can include allowing capable wireless devices to use two carriers deployed in two different frequency bands in a carrier aggregation mode of operation. In an exemplary embodiment, this includes enabling usage of a low-frequency carrier as a primary component carrier for a carrier aggregation mode of operation and, usage of the high-frequency carrier as a secondary component carrier. Additional high-frequency carriers may also be added as secondary carriers. When inter-band carrier aggregation is enabled, the majority of wireless devices (based on quantity, throughput, etc.) that are capable of carrier aggregation can use both carriers, in particular using one carrier as a primary component carrier for upload transmissions and/or control signaling while one or more additional carriers can be used for downlink transmissions.

Whereas, if at 420, it is determined that the quantity (or throughput requirement or any other measure) of wireless devices capable of inter-band carrier aggregation is lower than that of wireless devices not having this capability, then at 440 inter-band carrier aggregation is disabled in the sector. Disabling inter-band carrier aggregation in this case can include preventing capable wireless devices to use the two carriers deployed in two different frequency bands. For example, this includes disabling usage of the low-frequency carrier as a primary component carrier for the carrier aggregation mode of operation. Meanwhile, usage of the high-frequency carrier as the primary component carrier may be enabled. For example, intra-band carrier aggregation can be performed with the high-frequency carrier or contiguous carriers thereof. Further, when inter-band carrier aggregation is disabled, the majority of wireless devices (based on quantity, throughput, etc.) that are not capable of carrier aggregation can continue to use either carrier in different frequency bands, or can aggregate multiple carriers sharing the same (or a contiguous) frequency band via intra-band carrier aggregation. Thus, when inter-band carrier aggregation is disabled, additional resources are available in the control channel and for uplink transmissions for this majority of wireless devices incapable of using inter-band carrier aggregation.

Further, enabling or disabling usage of the low-frequency carrier as the primary component carrier for the carrier aggregation mode of operation comprises broadcasting an indicator on either frequency band, the indicator for indicating whether inter-band carrier aggregation is enabled or disabled within the sector. For example, upon determining that inter-band carrier aggregation capable wireless devices dominate one or more sectors, then an indicator indicating that inter-band carrier aggregation is enabled may be broadcast. Responsive to the indicator, wireless devices capable of inter-band carrier aggregation can attach to the low-frequency carrier as a primary component carrier and one or more high-frequency carriers as secondary component carriers. Thus, in an exemplary embodiment, the indicator can identify which carrier to use as a primary component carrier.

Figure 5A:
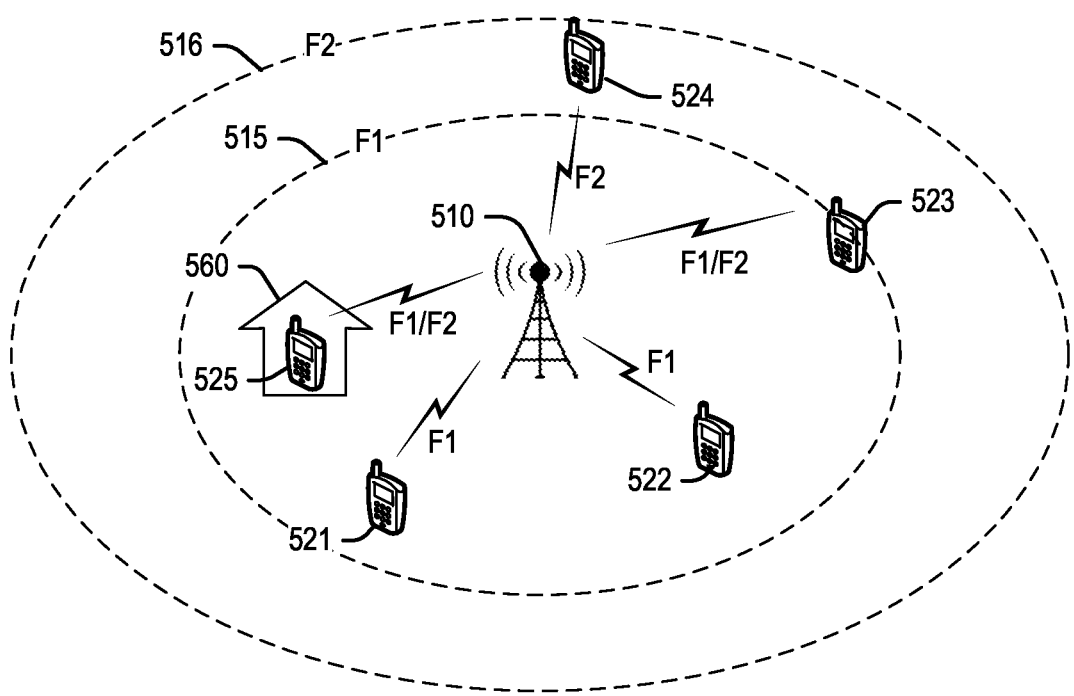
FIGS. 5A-5B depict exemplary activation and deactivation of inter-band carrier aggregation based on device capability.
Figure 5B:
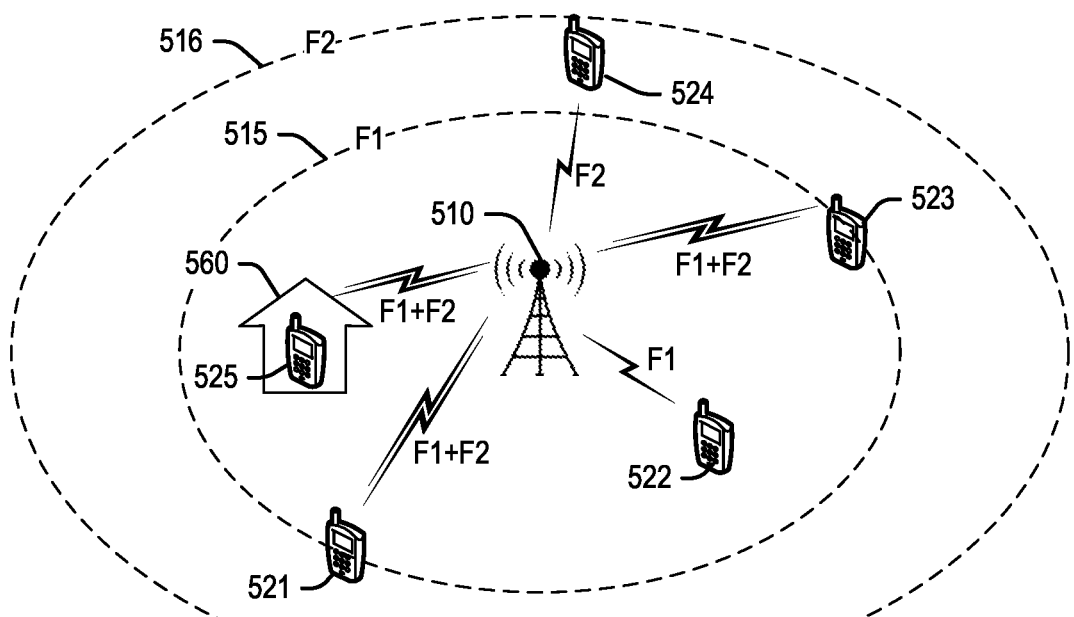

FIGS. 5A-5B depict exemplary activation and deactivation of inter-band carrier aggregation based on device capability. Access node 510 is illustrated as a serving access node providing wireless services to wireless devices 521, 522, 523, 524, 525 (hereinafter, 521-525). Access node 510 can include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 510 can be a small access node including a microcell access node, a picocell access node, a femtocell access node, or the like such as a home NodeB or a home eNodeB device. Access node 510 comprises components similar to access node 310 described with reference to FIG. 3, including transceivers and antennae configured to deploy a wireless air interface using two or more frequency bands, including but not limited to a first frequency band F1 over a coverage area 515, and a second frequency band F2 over a coverage area 516. In an exemplary embodiment, frequency band F1 uses frequencies that are higher than frequency band F2. Thus, due to propagation characteristics, coverage area 515 is smaller than coverage area 516. Further, the different sets of antennae can be used to implement various transmission modes or operating modes in each sector, including but not limited to MIMO (including SU-MIMO, MU-MIMO, mMIMO, beamforming, etc.), carrier aggregation (including inter-band and intra-band carrier aggregation), and different duplexing modes (including frequency-division-duplexing or FDD and time-division-duplexing or TDD).

Further, access node 510 (or a processing node communicatively coupled thereto) may be configured to execute a method including monitoring a dominant type of wireless device from among wireless devices 521-525 based on whether or not the wireless devices 521-525 are capable or incapable of inter-band carrier aggregation, and enabling or disabling inter-band carrier aggregation based thereon. The dominant type of wireless device 521-525 can be identified based on an identifier received by each wireless device 521-525 via, for instance, an international mobile subscriber identity (IMSI), model number, etc. Further, identifying the dominant type of wireless device can be based on a quantity of total wireless devices capable or incapable of performing inter-band carrier aggregation, or a throughput usage or requirement of capable versus incapable wireless devices. When the dominant type comprises wireless devices capable of inter-band carrier aggregation, usage of a low-frequency carrier (e.g. carrier F2) as a primary component carrier for an inter-band carrier aggregation mode of operation is enabled, while when the dominant type comprises wireless devices incapable of inter-band carrier aggregation, usage of the low-frequency carrier as a primary component carrier for the carrier aggregation mode of operation is disabled.

Thus, FIG. 5A illustrates a scenario where inter-band carrier aggregation is disabled, while FIG. 5B illustrates a scenario where inter-band carrier aggregation is enabled. With reference to FIG. 5A, wireless devices 521-525 are in communication with access node 510 via various combinations of frequencies F1 and F2. For example, wireless device 521, by virtue of being located within coverage area 515, may be configured to attach to one or more carriers on frequency band F1. In an exemplary embodiment, wireless device 521 may perform intra-band carrier aggregation with contiguous carriers on or around frequency band F1. Wireless device 522 may be similarly configured. Meanwhile, wireless device 523, located at an edge of coverage area 515, can be configured to utilize either frequency band F1 or F2, depending on which signal strength is stronger, or how the signal strengths compare to different thresholds. Wireless device 524, by virtue of being located outside coverage area 515 and within coverage area 516, may be configured to attach to one or more carriers on frequency band F2. Located within building 560, wireless device 525 may not receive a good signal strength from frequency band F1 as a consequence of the higher frequency, and may receive a good signal strength from frequency band F2 having a lower frequency. Thus, depending on the signal strengths and/or bandwidth requirements, wireless device 525 is also attached to access node 510 via either frequency band F1/F2.

Further, one or more of wireless devices 521-525 may be capable of inter-band carrier aggregation. For example, one or more of wireless devices 521-525 may be capable of using the second carrier F2 as a primary component carrier for control and uplink transmissions, and the first carrier F1 as a secondary component carrier for downlink transmissions. For example, access node 510 may determine, based from connection requests or otherwise obtaining device capabilities of wireless devices 521-525, that a predominant type of wireless comprises wireless devices capable of inter-band carrier aggregation. Thus, FIG. 5B illustrates inter-band carrier aggregation being enabled for sectors deployed by access node 510. Wireless devices that are capable of inter-band carrier aggregation and that would benefit from using inter-band carrier aggregation, are shown as using both carriers F1+F2. For example, wireless devices 523 and 524 may benefit from using inter-band carrier aggregation, since their reception of frequency band F1 is poor. Further, as illustrated in FIG. 5B, wireless device 521 has moved its location closer towards an edge of coverage area 515 and, therefore, benefits from inter-band carrier aggregation. Each of wireless devices 521, 523, and 525 is capable of inter-band carrier aggregation. Meanwhile, whether or not wireless device 522 or 524 are capable of inter-band carrier aggregation, they may yet perform intra-band carrier aggregation, utilizing two carriers deployed in frequency band F1 or F2, based on their application requirement or receive signal strength.

Further, enabling or disabling usage of the low-frequency carrier as the primary component carrier for the carrier aggregation mode of operation comprises broadcasting an indicator on either frequency band F1 or F2, the indicator for indicating whether inter-band carrier aggregation is enabled or disabled within the sector. For example, access node 510, upon determining that inter-band carrier aggregation capable wireless devices dominate one or more sectors, may broadcast an indicator indicating that inter-band carrier aggregation is enabled. In response to the indicator, wireless devices capable of inter-band carrier aggregation (such as wireless devices 521, 523, 525) can attach to frequency F2 as a primary component carrier and F1 as a secondary component carrier. Thus, in an exemplary embodiment, the indicator can identify which carrier to use as a primary component carrier.

Figure 6:
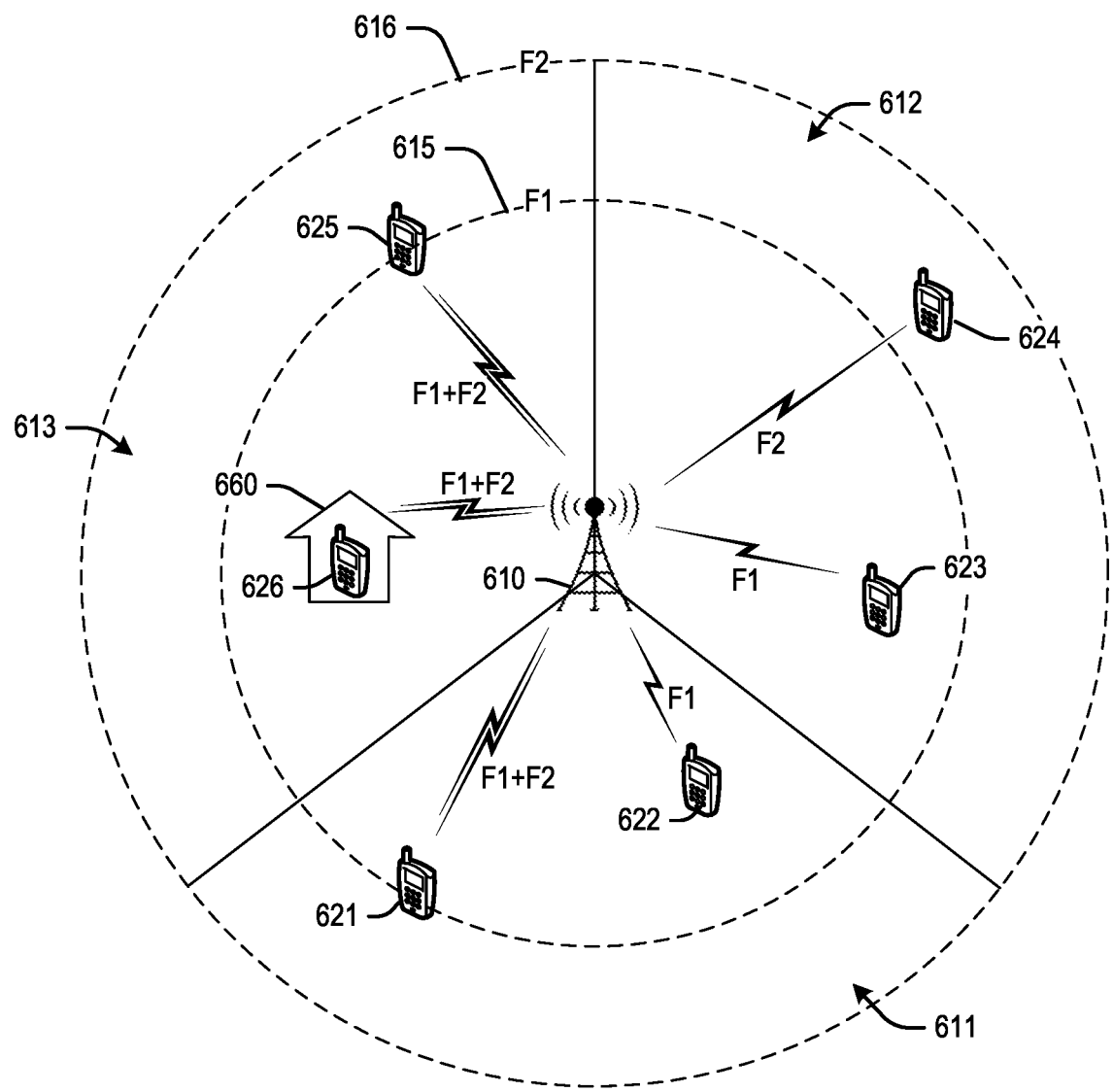
FIG. 6 depicts exemplary activation and deactivation of inter-band carrier aggregation within different sectors based on capability of wireless devices within each sector.

FIG. 6 depicts exemplary activation and deactivation of inter-band carrier aggregation within different sectors based on capabilities of wireless devices within each sector. In this embodiment, access node 610 can include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 610 can be a small access node including a microcell access node, a picocell access node, a femtocell access node, or the like such as a home NodeB or a home eNodeB device. Access node 610 comprises components similar to access node 310 described with reference to FIG. 3, including transceivers and antennae configured to deploy a wireless air interface using two or more frequency bands, including but not limited to a first frequency band F1 over a coverage area 615, and a second frequency band F2 over a coverage area 616. In an exemplary embodiment, frequency band F1 uses frequencies that are higher than frequency band F2. Thus, due to propagation characteristics, coverage area 615 is smaller than coverage area 616. Further, access node 610 may comprise antennae sufficient to deploy each frequency band F1 and F2 in each of three different sectors 611, 612, and 613.

Consequently, based on the operations described herein, access node 610 can further disable or enable inter-band carrier aggregation in each individual sectors 611-613, responsive to determining a dominant type of wireless device from among wireless devices 621-625 in each sector 611-613, based on whether or not the wireless devices 621-625 are capable or incapable of inter-band carrier aggregation. The dominant type of wireless device 621-625 in each sector 611-613 can be identified based on an identifier received by each wireless device 621-625 via, for instance, an international mobile subscriber identity (IMSI), model number, etc. Further, identifying the dominant type of wireless device in each sector 611-613 can be based on a quantity of total wireless devices capable or incapable of performing inter-band carrier aggregation in each sector 611-613, or a throughput usage or requirement in each sector 611-613 of capable versus incapable wireless devices. When the dominant type in one of sectors 611-613 comprises wireless devices capable of inter-band carrier aggregation, usage of a low-frequency carrier (e.g. carrier F2) as a primary component carrier for an inter-band carrier aggregation mode of operation is enabled in that sector, while when the dominant type comprises wireless devices incapable of inter-band carrier aggregation, usage of the low-frequency carrier as a primary component carrier for the carrier aggregation mode of operation is disabled in that sector.

Thus, sector 611 illustrates a scenario where inter-band carrier aggregation is enabled, and in use by wireless device 621 located at an edge of coverage area 615 and using aggregated carriers in both frequency bands F1+F2. Inter-band carrier aggregation in this sector 611 may be enabled responsive to determining that both wireless device 621 and 622 are capable of inter-band carrier aggregation. This may be despite the fact that wireless device 622, by virtue of being located within coverage area 615, may be configured to attach to one or more carriers on frequency band F1. Alternatively, inter-band carrier aggregation in this sector 611 may be enabled responsive to determining that while only wireless device 621 is capable of inter-band carrier aggregation (and wireless device 622 is not capable), a throughput usage or requirement of wireless device 621 may exceed that of wireless device 622. Further, wireless device 622 may perform intra-band carrier aggregation with contiguous carriers on or around frequency band F1.

Conversely, sector 612 illustrates a scenario where inter-band carrier aggregation is disabled, possibly responsive to determining that either both wireless devices 623 and 624 are not capable of inter-band carrier aggregation, or responsive to determining that one of wireless devices 623 and 624 is capable, yet a throughput requirement of the capable device is smaller than that of the incapable device. Thus, wireless device 623 is illustrated as using frequency band F1, and wireless device 624 is illustrated as using frequency band F2. Further, wireless devices 623, 624 may perform intra-band carrier aggregation with contiguous carriers on or around frequency bands F1 and F2 respectively.

Finally, sector 613 illustrates a scenario where inter-band carrier aggregation is enabled responsive to determining that both wireless devices 625 and 626 are capable of performing inter-band carrier aggregation. Thus, in this case, inter-band carrier aggregation using aggregated carriers in both frequency bands F1+F2 is performed by wireless device 625 located at an edge of coverage area 615, and by wireless device 626 located inside building 660.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing inter-band carrier aggregation based on device capability, the method comprising:
   determining a number of wireless devices capable of inter-band carrier aggregation in a wireless sector is greater than a number of wireless devices incapable of inter-band carrier aggregation in the wireless sector; and
   when the number of wireless devices capable of inter-band carrier aggregation is greater than the number of wireless devices incapable of inter-band carrier aggregation, enabling usage of a low-frequency carrier as a primary component carrier for a carrier aggregation mode of operation.

2. The method of claim 1, wherein the wireless sector is deployed by an access node, the access node being configured to deploy the low-frequency carrier and a high-frequency carrier.

3. The method of claim 2, further comprising enabling usage of the high-frequency carrier as a secondary component carrier when the number of wireless devices capable of inter-band carrier aggregation is greater than the number of wireless devices incapable of inter-band carrier aggregation.

4. The method of claim 2, further comprising enabling usage of the high-frequency carrier as the primary component carrier when the number of wireless devices capable of inter-band carrier aggregation is less than the number of wireless devices capable of inter-band carrier aggregation.

5. The method of claim 2, wherein the low-frequency carrier has a larger geographical coverage area than the high-frequency carrier.

6. The method of claim 1, wherein determining the number of wireless devices capable of inter-band carrier aggregation in the wireless sector comprises determining a type of wireless device based on an identifier of the wireless device.

7. The method of claim 1, wherein a majority of wireless devices in the wireless sector are capable of performing inter-band carrier aggregation.

8. The method of claim 1, further comprising determining that a majority of throughput usage in the wireless sector is associated with wireless devices that are capable of performing inter-band carrier aggregation.

9. The method of claim 1, wherein enabling or disabling usage of the low-frequency carrier as the primary component carrier for the carrier aggregation mode of operation comprises broadcasting an indicator within the wireless sector, the indicator for indicating whether inter-band carrier aggregation is enabled or disabled within the wireless sector.

10. A system for performing inter-band carrier aggregation based on device capability, the system comprising
   an access node configured to deploy at least a first carrier utilizing a first frequency band and a second carrier utilizing a second frequency band, the second frequency band comprising higher frequencies than the first frequency band; and
   a processing node communicably coupled to the access node, the processing node being configured to perform operations comprising:
   determining that a majority of throughput usage in a wireless sector is associated with devices capable of performing inter-band carrier aggregation; and
   when the majority of throughput usage in the wireless sector is associated with devices capable of performing inter-band-carrier aggregation, enabling the first carrier as a primary component carrier for a carrier aggregation mode of operation.

11. The system of claim 10, wherein the first carrier comprises a low-frequency carrier.

12. The system of claim 11, wherein the operations further comprise enabling usage of the second carrier as a secondary component carrier.

13. The system of claim 10, wherein the operations further comprise enabling usage of the second carrier as the primary component carrier when the majority of throughput usage in the wireless sector is associated with wireless devices incapable of inter-band carrier aggregation.

14. The system of claim 10, wherein the first carrier has a larger geographical coverage area than the second carrier.

15. The system of claim 10, wherein a dominant type of wireless device is identified based on an identifier of the wireless device.

16. A processing node for performing inter-band carrier aggregation based on device capability, the processing node being configured to perform operations comprising:
   determining a number of wireless devices capable of inter-band carrier aggregation in a wireless sector is greater than a number of wireless devices incapable of inter-band carrier aggregation in the wireless sector; and
   when the number of wireless devices capable of inter-band carrier aggregation is greater than the number of wireless devices incapable of inter-band carrier aggregation, enabling usage of a low-frequency carrier as a primary component carrier for a carrier aggregation mode of operation.

17. The processing node of claim 16, wherein the wireless sector is deployed by an access node, the access node being configured to deploy the low-frequency carrier and a high-frequency carrier.

18. The processing node of claim 17, further comprising enabling usage of the high-frequency carrier as a secondary component carrier when the number of wireless devices capable of inter-band carrier aggregation is greater than the number of wireless devices incapable of inter-band carrier aggregation.

19. The processing node of claim 17, further comprising enabling usage of the high-frequency carrier as the primary component carrier when the number of wireless devices capable of inter-band carrier aggregation is less than the number of wireless devices incapable of inter-band carrier aggregation.

20. The processing node of claim 17, wherein the low-frequency carrier has a larger geographical coverage area than the high-frequency carrier.

* * * * *